Dec. 29, 1936.                C. J. BECK                2,065,503
                       ROLL SHEET CUTTING MACHINE
                        Filed Jan. 2, 1934         3 Sheets-Sheet 1

Inventor
Charles J. Beck
by his Attorneys
Howson & Howson

Dec. 29, 1936.   C. J. BECK   2,065,503
ROLL SHEET CUTTING MACHINE
Filed Jan. 2, 1934   3 Sheets-Sheet 2
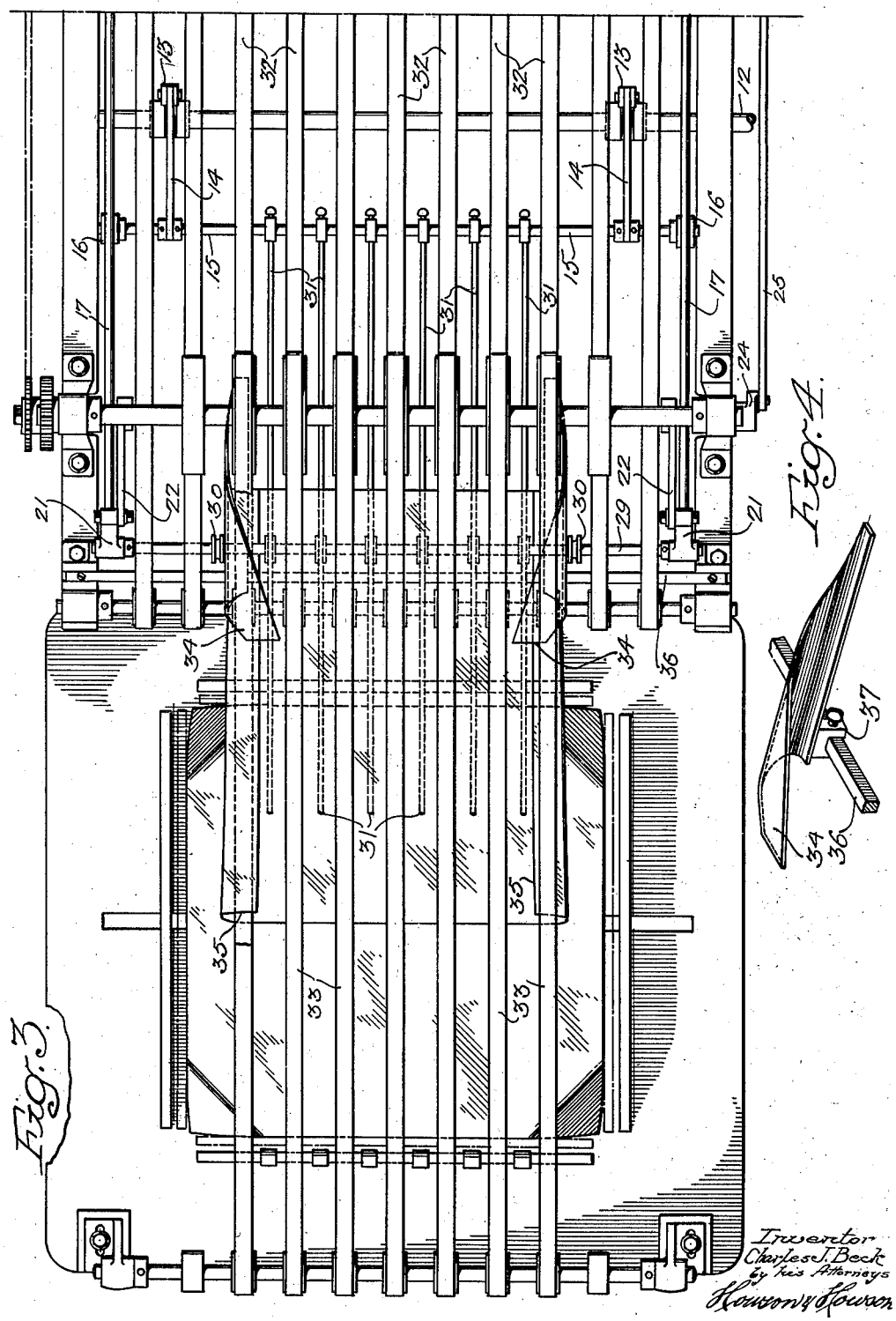
Inventor
Charles J. Beck
by his Attorneys
Howson & Howson Dec. 29, 1936.  C. J. BECK  2,065,503
ROLL SHEET CUTTING MACHINE
Filed Jan. 2, 1934  3 Sheets-Sheet 3
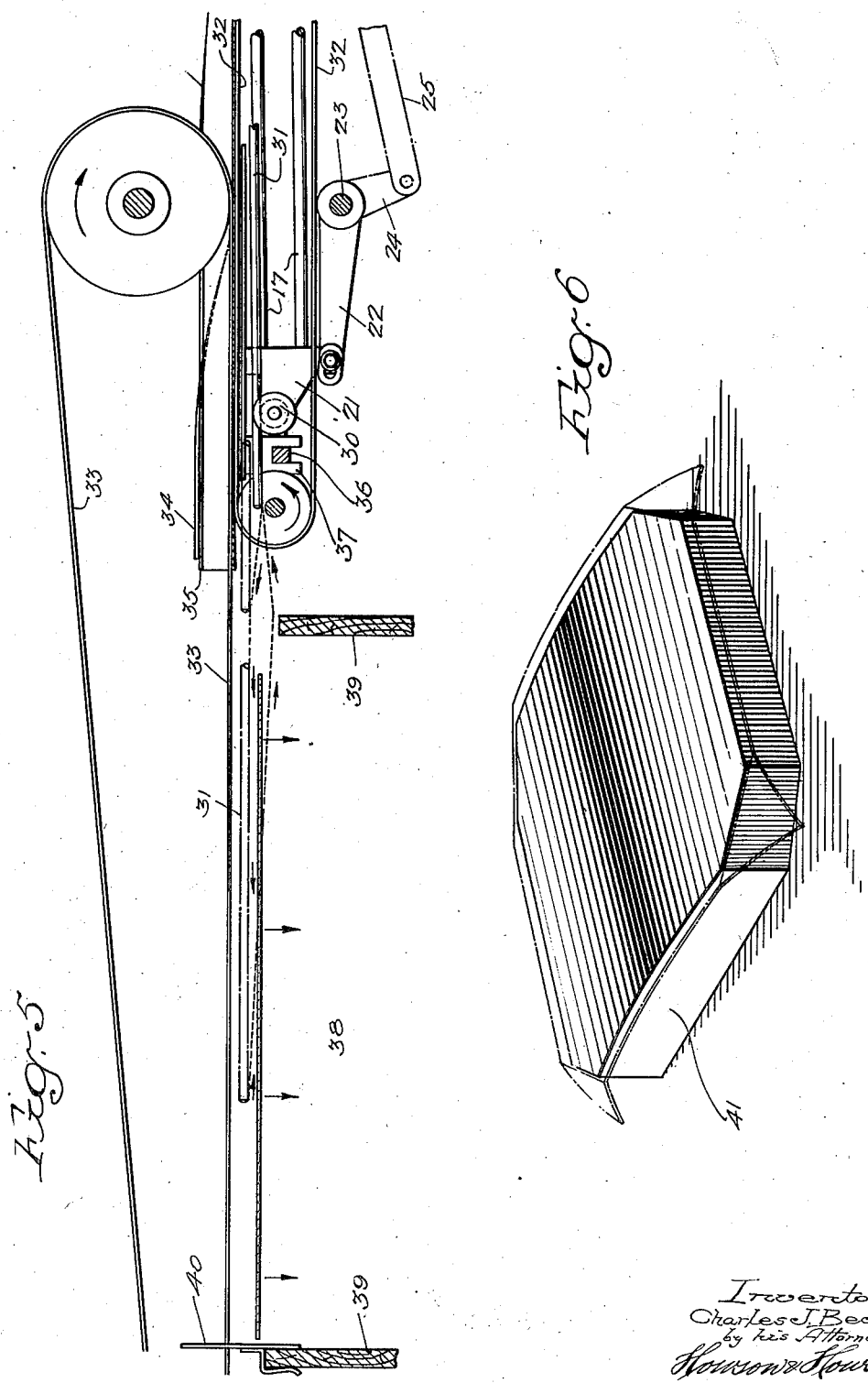
Inventor:
Charles J. Beck
by his Attorneys
Howson & Howson Patented Dec. 29, 1936

2,065,503

UNITED STATES PATENT OFFICE 2,065,503

ROLL SHEET CUTTING MACHINE

Charles J. Beck, Philadelphia, Pa.

Application January 2, 1934, Serial No. 704,969

10 Claims. (Cl. 271—84)

This invention relates to improvements in machines for cutting sections from a continuous sheet or web, and for stacking the severed sections. More specifically, the invention contemplates the production of a machine which shall be capable of efficiently handling "Cellophane" and sheet material of similar characteristics.

It has been found that the cutting and stacking machines previously used for paper are generally unsatisfactory for handling "Cellophane". This is due primarily to the inherent flexibility and lack of stiffness of "Cellophane" materials. By the present invention, I have provided a machine capable of efficiently cutting "Cellophane" sections from a continuous strip and delivering the severed sections to and neatly stacking said sections at a predetermined point of assembly.

Another object of the invention is to provide a machine of the stated character which shall be capable of operating efficiently at relatively high speeds.

The invention further resides in certain novel structural features and operating details hereinafter described and illustrated in the attached drawings, in which:

Fig. 3 is a plan view of the outer end of the machine and including the major part of the delivery mechanism;

Fig. 4 is a fragmentary perspective showing a detail of the mechanism;

Fig. 5 is a diagrammatic longitudinal sectional view illustrating other details of the mechanism and their mode of operation, and Fig. 6 is a view in perspective of the landing form which receives the severed ends.

With reference to the drawings, the machine comprises the usual frame 1 which supports a rotary cutting head 2 by means of which a strip 3 (shown in broken lines) of "Cellophane" or other material fed to the cutter by a feed roller 4 may be divided into sections of predetermined length. The cutting head may be of any suitable type, such, for example, as that shown in U. S. Patent No. 1,715,271, dated May 28, 1929. The details of this cutting mechanism form no part of the present invention.

Figure 2:
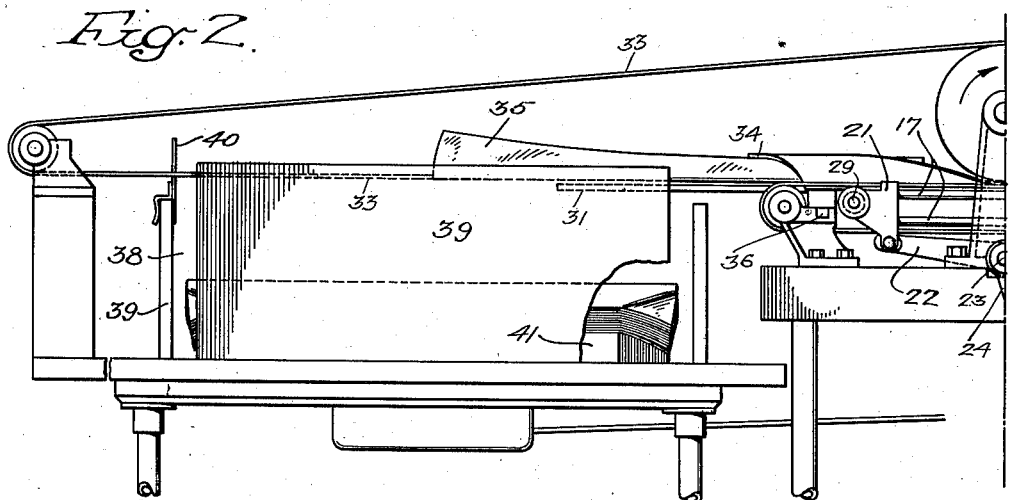
Fig. 2 is a side elevational view illustrating the rear or delivery end of the machine.
Figure 1:
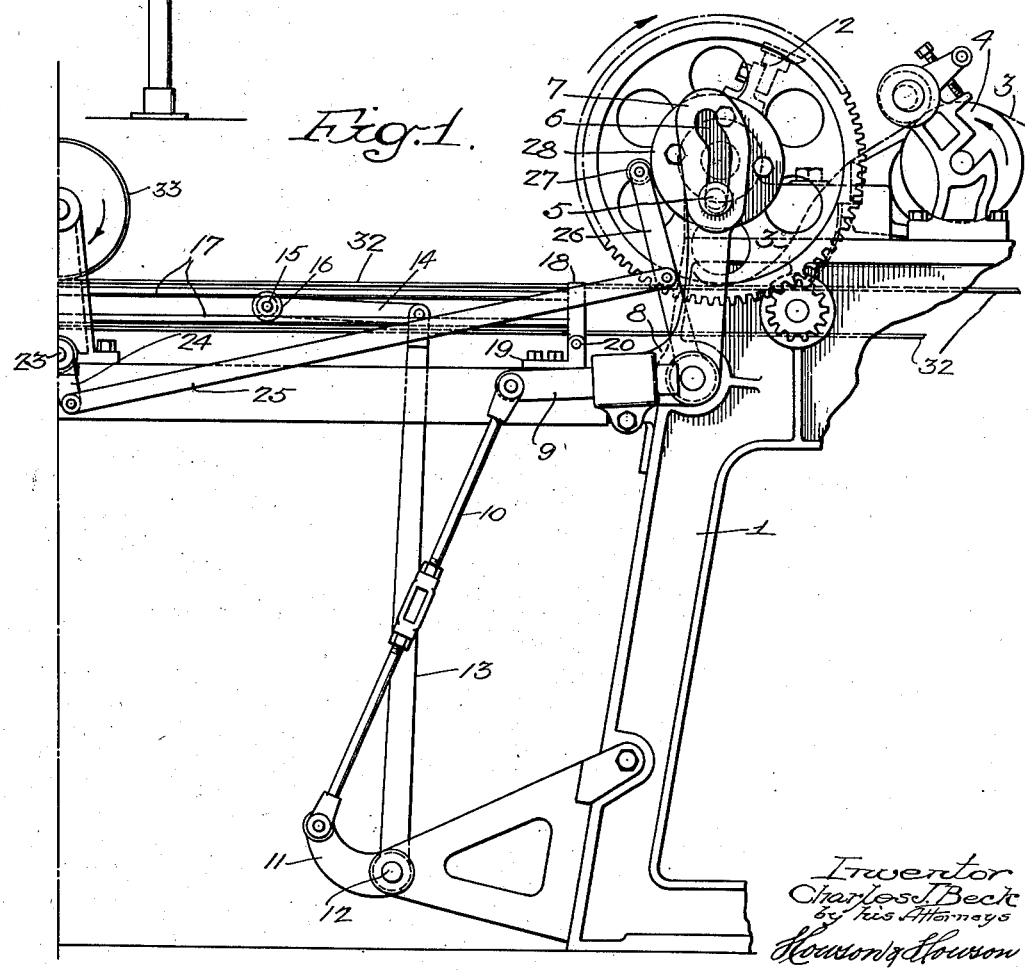
Figure 1 is a fragmentary side elevational view of the forward end of the machine illustrating the cutting mechanism.

Carried by the rotary cutter shaft is a crank pin 5 which enters an offset slot 6 in the outer end of one arm 7 of a bell crank lever 8. The other arm 9 of the bell crank 8 is adjustable as to length and is connected through a rod 10 to an arm 11 on a shaft 12 journaled in the frame 1 and extending transversely across the machine, see Fig. 3. Intermediate its ends, the shaft 12 has a pair of spaced upstanding arms 13, the upper ends of which are connected by pivoted arms 14 to a cross rod 15. At each end the rod 15 carries a grooved roller 16, and these rollers operate between pairs of vertically spaced rods 17 which constitute guides restricting the movement of the rod 15. Each pair of rods 17 is fixed at one end in a block 18, see Fig. 1, and these blocks 18 are respectively hinged to brackets 19 at opposite sides of the frame. The hinge pin for the block 18 shown in Fig. 1 is indicated by the reference numeral 20. The opposite ends of the rods 17 of each pair, see Figs. 2, 3 and 5, are fixed in members 21, and each of these members is supported on the outer end of an arm 22 secured to a shaft 23 journaled in and extending transversely across the machine. The shaft 23 has at one end an arm 24 which is connected by a rod 25 to a lever arm 26 journaled at its lower end in the frame 1 and having at its upper end a roller 27 which engages the face of a cam 28 on the cutter head 2. Extending transversely between the members 21 is a shaft 29 which carries a plurality of grooved rollers 30, which rollers constitute supports and guides for a plurality of finger rods 31 secured to the rod 15. The combined movement of the rod 15, which as previously described is actuated from the crank 5, and of the rods 17 actuated from the cam 28, causes the fingers 31 to move in a path indicated in broken lines in Fig. 5, the rods being projected in a relatively elevated plane towards the rear of the machine and being retracted with a downward movement to the position in which it is shown in full lines. The position of the rods in their rearwardly extended position is shown in broken lines, and the dotted lines marked with the arrows indicate the path of the extremities of the rods.

Referring to Figs. 1, 3 and 5, the strip of "Cellophane" 3 is fed through the cutter head 2 onto a series of continuous belts 32 which carry the severed sections rearwardly and under a corresponding plurality of continuous belts 33. The sheets confined between the belts 32 and 33 are carried rearwardly between a pair of formers 34, 34, one at each side of the path of the sheets, which are adapted to engage and turn the side edges of the individual sheets upwardly and over the lower run of the outer pair of belts 33, as illustrated in Figs 2, 3 and 5, wherein the turnedover side edges of a sheet passing through the formers are indicated by the reference numeral 35. The formers 34, the character of which is illustrated in Fig. 4, are adjustably mounted on a transverse rod 36, each of the formers comprising a bifurcated base block 37 which straddles the said bar, and the bar being mounted in the frame of the machine, as illustrated in Fig. 3. When thus curled over at the edges, the highly flexible "Cellophane" sheet is given sufficient effective rigidity to insure accuracy of travel with the lower run of the belt 33 to a position over a jogging box 38 at the rear end of the machine. The box 38 comprises the usual movable walls 39, and the rear wall of the box comprises an upward extension 40 which constitutes an abutment against which the advance end edge of the sheet moving with the belt 33 impinges. When the sheet thus engages the abutment 40, the curled-over sides of the sheet fall outwardly, and the sheet falls by gravity into the box 38.

It will be noted that as each sheet leaves the formers 34, they find a support upon the rods 31, which move rearwardly in the elevated plane in synchronism with the movement of the sheet with the belt 33, and it will be noted further that as the rods 31 are retracted, they also move downwardly so as to permit a corresponding downward movement of each sheet, clearing the path for the succeeding sheets to move into position above the box 38, and also for the succeeding rearward movement of the rods 31.

The construction and mode of operation of the jogging box 38 may be in accordance with the known principles, the walls 39 being vibrated or reciprocated, as indicated by the broken line position in Fig. 3, with the result that the individual sheets are centered in the box. In accordance with the present invention, I provide in the bottom of the box a landing block 41, the form of which is shown in Fig. 6. As therein illustrated, the upper surface of the block is convexed in one direction, and the corners of the block are cut away so that when the sheets rest upon the block, their corners are unsupported. This block 41 materially aids the stacking operation, in that by reason of the curved receiving surface there is little tendency for the sheets to trap air, which interferes with the normal settling of the sheet onto the stack. The sheet engages first at the high center portion of the block and subsequently settles down towards the edges, expelling the air in this normal settling operation, and there is no tendency for the sheet to ride the air into an offset position with respect to the stack. Also this curvature of the block gives the sheet a camber, which facilitates the jogging operation by giving the highly flexible sheet an effective stiffness, which it does not otherwise possess, and this stiffening effect is also afforded in the opposite dimension by the depressed unsupported corners of the sheet.

As previously set forth, considerable difficulty has been experienced in handling sheets of "Cellophane" and like material by reason of the extreme flexibility and lack of stiffness. This has been overcome in the present instance by the use of the fingers 31 in conjunction with the overhead delivery tapes 33 and the formers 34 which throw the side edges of the sheets upwardly over the belts as described and thereby give the sheet an effective stiffness insuring a normal movement of each sheet into the desired position over the jogging box 38. The foregoing devices also permit operation of the machine at relatively high rates of speed, the rods 31 by reason of their movement as previously described and at the higher speeds acting in effect to actually push the individual and previously released sheets downwardly toward their position on the stack and insuring that each sheet shall be clear of the succeeding sheet as it advances into position. The landing form 41 insures an equally rapid stacking of the sheets, as previously described.

I claim:

1. In delivery mechanism for sheets of "Cellophane" and similar highly flexible materials, the combination with a conveyer, of means for passing said sheets to the under side of said conveyer, and means for turning the side edges of the sheets upwardly over the edges of said conveyer, and means for disengaging the sheets from the conveyer including an abutment positioned in the path of the sheets for engagement with the advance edge of the latter.

2. In mechanism of the character set forth, the combination with a conveyer, of means for delivering flexible sheets to the under side of said conveyer, means for folding the side edges of said sheets upwardly over the edges of said conveyer, and means for interrupting the movement of said sheets with the conveyer whereby said sheets may drop downwardly from said conveyer.

3. The combination with a conveyer, of a receptacle positioned under said conveyer, means for delivering flexible sheets to the under side of said conveyer, means for turning the side edges of said sheets upwardly over the edges of said conveyer, and means for interrupting the movement of said sheets with the conveyer at a point above the receptacle.

4. The combination with a conveyer for flexible sheets, of a second conveyer positioned above and overlapping the conveyer first named, the adjacent portions of said conveyer moving in the same direction, and means for turning the edges of said sheets upwardly over the edges of said second conveyer as said sheets leave the conveyer first named, substantially as and for the purpose set forth.

5. The combination with an endless conveyer, of a second endless conveyer positioned above and overlapping the delivery end of the first conveyer, means for operating said conveyer so that the upper run of the first conveyer and the lower run of the said second conveyer move in the same direction, and means positioned at the discharge end of said first conveyer for turning the side edges of sheets delivered by the last-named conveyer upwardly over the edges of the lower run of said second conveyer.

6. In delivery mechanism for flexible sheet material, the combination with a conveyer, of a second conveyer positioned above and overlapping the delivery end of said first conveyer whereby said sheets delivered by the first conveyer are confined between said conveyers, and means adjacent the delivery end of said first conveyer for turning the side edges of said sheets upwardly over the sides of said second conveyer, substantially as and for the purpose set forth.

7. In delivery mechanism of the character set forth, the combination with a conveyer, of a second conveyer positioned above and in contiguous overlapping relation with the delivery end of the first conveyer, and formers located at opposite sides of and adjacent the overlapping portions of said conveyers adapted to engage the projecting side edges of sheets of flexible material confined between and moving with said conveyers to turn said edges upwardly over the side edges of said second conveyer.

8. In delivery mechanism for sheets of flexible material, the combination with a conveyer, of means for feeding said sheets to the under side of said conveyer, means for turning the projecting side edges of said sheets upwardly over the edges of said conveyer, support means for said sheets underlying the conveyer, and means for projecting said support means in the direction of movement of said conveyer and for subsequently retracting said support means to permit the sheets to drop from the conveyer.

9. In delivery mechanism for sheets of flexible material, the combination with a conveyer for said sheets, of a support adapted to move outwardly under said sheets from the delivery end of said conveyer and substantially in the plane of the latter, mechanism for projecting said support in said plane and for subsequently retracting the support, and means operating in synchronism with said mechanism for causing the support to move downwardly from said plane during the operation of the retracting means.

10. In delivery mechanism for sheets of flexible material, the combination with a conveyer for said sheets, of a support adapted to move outwardly under said sheets from the delivery end of said conveyer and substantially in the plane of the latter, mechanism for projecting said support in said plane and for subsequently retracting the support, and means operating in synchronism with said mechanism for causing the support to move downwardly from said plane during the operation of the retracting means, said means comprising a carrier for said support and means for guiding the support in a fixed path in said carrier, and mechanism operating in synchronism with the said projecting and retracting mechanism for depressing the carrier during said retracting operation.

CHARLES J. BECK.